United States Patent [19]

Tupper et al.

[11] Patent Number: 4,644,617
[45] Date of Patent: Feb. 24, 1987

[54] RELEASABLE LOCKING COUPLING OR SUPPORT DEVICE

[76] Inventors: Alan W. Tupper, The Weavers House, Castle Combe Wiltshire, SN14 7HX; Peter R. Flux, 1 Chaveywell Court, Castle Street, Calne, Wiltshire, both of England

[21] Appl. No.: 619,164
[22] PCT Filed: Sep. 20, 1983
[86] PCT No.: PCT/GB83/00230
§ 371 Date: Aug. 1, 1984
§ 102(e) Date: Aug. 1, 1984
[87] PCT Pub. No.: WO84/01414
PCT Pub. Date: Apr. 12, 1984

[30] Foreign Application Priority Data

Sep. 28, 1982 [GB] United Kingdom ............... 8227660
Feb. 14, 1983 [GB] United Kingdom ............... 8304044

[51] Int. Cl.$^4$ .................................................. E04G 25/04
[52] U.S. Cl. ..................................... 24/611; 24/114.5; 24/609; 24/643; 248/354.7; 403/105; 403/330; 411/21; 411/342; 411/344
[58] Field of Search .................. 24/453, 604, 609, 611, 24/584, 608, 643, 114.5; 411/21, 340, 341, 342, 344, 345; 135/25 R, 69, 75, 108; 403/105, 107, 108, 330; 248/354.6, 408, 409, 188.5, 333, 354.7; 114/104, 108, 218; 182/210, 211

[56] References Cited

U.S. PATENT DOCUMENTS

| | | | |
|---|---|---|---|
| 2,124,658 | 7/1938 | Smith | 411/341 |
| 2,892,647 | 6/1959 | O'Neill | 403/105 |
| 3,161,395 | 12/1964 | Cartar | 403/105 X |
| 3,697,103 | 10/1972 | Mostyn | 248/188.5 X |
| 3,793,682 | 2/1974 | Nelson | |
| 4,348,790 | 9/1982 | Kuramoto et al. | 403/330 X |
| 4,451,084 | 5/1984 | Seeley | 403/105 X |

FOREIGN PATENT DOCUMENTS

| | | | |
|---|---|---|---|
| 7084 | 1/1980 | European Pat. Off. | |
| 13693 | 8/1980 | European Pat. Off. | |
| 428462 | 3/1925 | Fed. Rep. of Germany | 403/330 |
| 654181 | 11/1937 | Fed. Rep. of Germany | |
| 729072 | 11/1942 | Fed. Rep. of Germany | 248/408 |
| 1600191 | 8/1970 | France | |
| 2101774 | 3/1972 | France | |
| 208803 | 5/1940 | Switzerland | |
| 399843 | 4/1966 | Switzerland | |
| 858755 | 1/1961 | United Kingdom | 403/330 |
| 1077068 | 7/1967 | United Kingdom | |
| 1121087 | 7/1968 | United Kingdom | |
| 1560491 | 2/1980 | United Kingdom | |
| 572594 | 9/1977 | U.S.S.R. | 411/341 |

Primary Examiner—Kenneth J. Dorner
Assistant Examiner—James R. Brittain
Attorney, Agent, or Firm—Scully, Scott, Murphy & Presser

[57] ABSTRACT

A releasable locking device comprises a tubular housing (180) having a pair of rotary pawls (182) mounted therein. The angular position of the pawls are controlled by spring-loaded balls (183). A line (179) passing through the housing has a collar (184) thereon which latches with the pawls when the collar is brought into engagement therewith, the pawls being rotated so that the balls then bear on adjoining surfaces of the pawls. When the line is subsequently slackened the balls (183) act on the pawls to rotate them further into the housing so that on subsequent engagement by the collar (184), they are free to rotate so as to allow the collar to pass through the housing. This system provides an automatic latching of the line (179) followed by automatic disengagement of the latch simply by releasing tension in the line followed by reapplying such tension. Therefore latching and unlatching can be effected simply from a position remote from the latching mechanism.

15 Claims, 40 Drawing Figures

Fig. 2.
Fig. 3.
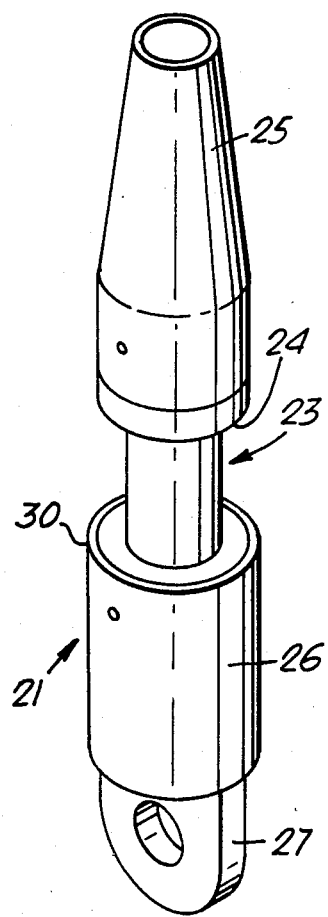
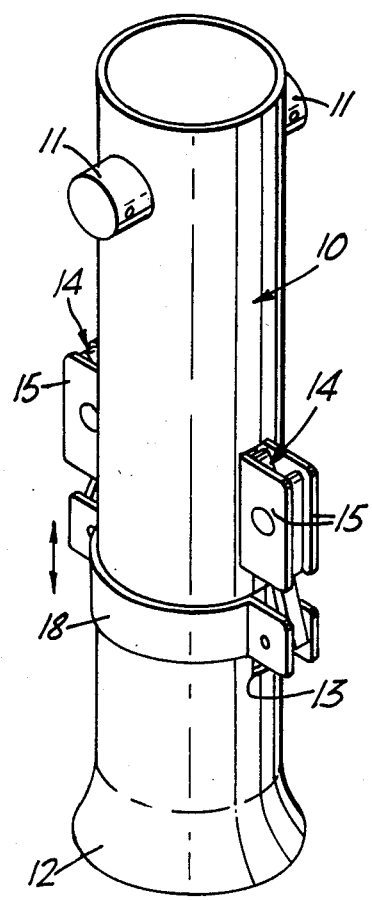

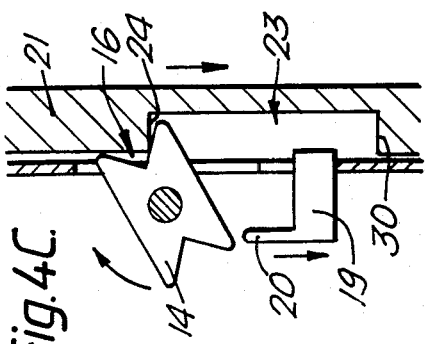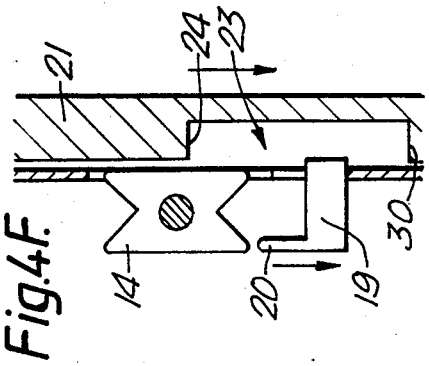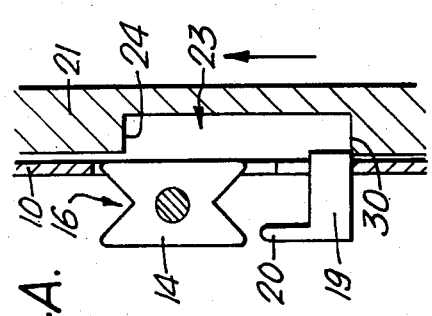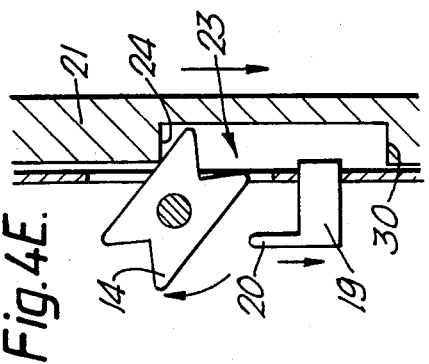

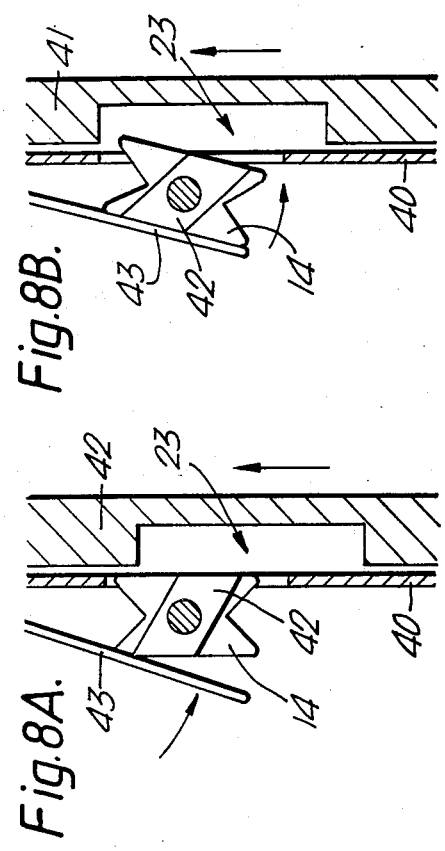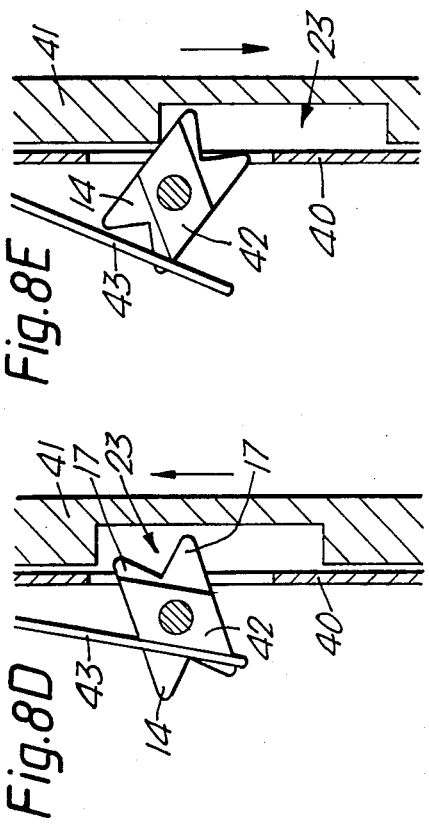

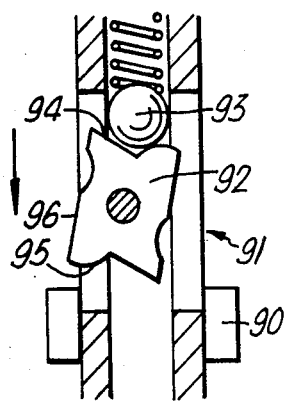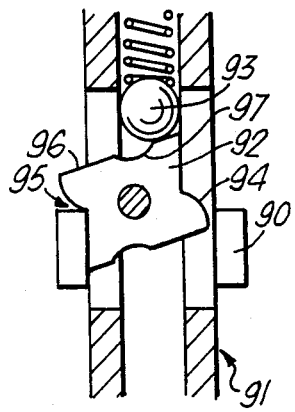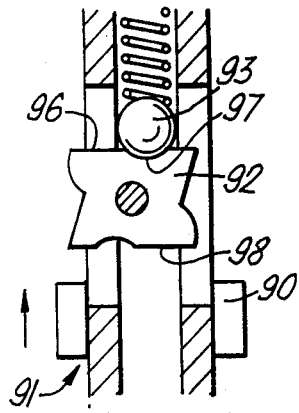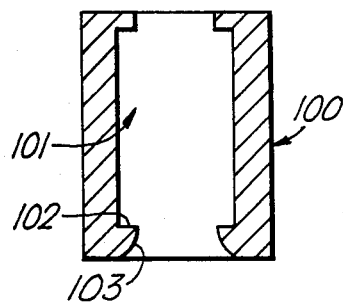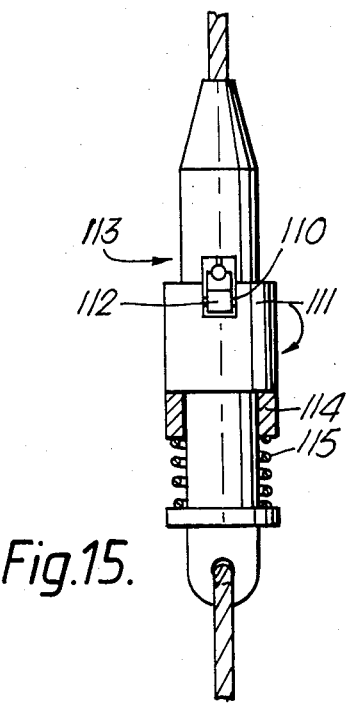

RELEASABLE LOCKING COUPLING OR SUPPORT DEVICE

FIELD AND BACKGROUND OF THE INVENTION

This invention relates to a releasable locking coupling or support device for use particularly, but not exclusively, in latching a load, e.g. in a raised position, so that tension in a hauling line can be relaxed, or releasably coupling together two parts or releasably securing one part in or to another part or structure, or forming a rotary coupling between two parts, or providing a releasable load support.

A sail is generally held in its raised position by maintaining tension in the halyard associated with the sail. However the compression force normally exerted on the mast by the tension in the halyard and the weight of the sail can be substantially reduced if, in its raised position, the sail can be latched at its upper end with respect to the mast so that the tension in the halyard can be relaxed. In British Patent Specification No. 2096957 (81.12106) there is described with reference to FIGS. 6 to 8 of the drawings thereof one possible system for suspending a sail in its raised position from a mast head allowing the tension in the associated halyard to be relaxed.

SUMMARY OF THE INVENTION

The invention provides a device which is applicable to systems for suspending sails in their raised positions and also to a variety of other types of coupling systems.

The invention provides a releasable locking coupling or support device comprising two parts which are or can be brought into a relatively slidable disposition, and interengageable latching means on the parts which latching means are adapted to be engageable automatically when said parts are in said disposition and one of said parts is moved in a first direction relative to the other part by a predetermined amount so as to restrict subsequent movement in the same or the opposite direction, respectively, of said first part relative to said other part, and are disengageable automatically on sufficient movement of said first part relative to said other part, from the latched position thereof in said opposite direction or said first direction respectively, followed by movement thereof in said first direction or said opposite direction respectively.

In some embodiments said first part may be a shuttle device and said other part may be a generally tubular housing in at least one end of which said shuttle device is engageable. The expression "generally tubular housing" is used herein to include a housing having a longitudinal slot or other aperture in its wall to allow the passage through the housing of elements associated in use with the shuttle device and projecting laterally thereof. The term "shuttle device" is used herein to include generally devices slidable relative to another part or structure to which they can be releasably latched in accordance with the invention, without necessarily engaging in that part or structure, as well as including devices which are plugged into apertures in parts or structures to be releasably secured therein by a latching mechanism in accordance with the invention.

In other embodiments said first part may be a shuttle device for slidably mounting on an elongate track, e.g. a shuttle slidably mounted for movement along a mast of a marine vessel, said other part being an abutment for location on, or provided by a part of, said track adjacent the path of movement of the shuttle device therealong.

A device according to the invention can for example, be associated with a halyard or other hauling rope or line, with said housing fixed with respect to an upper portion of a mast or said track provided by the mast and the shuttle device fastened at one end of the halyard or other hauling line and also with respect to the luff of a sail so that when the sail is raised the shuttle device becomes latched with respect to the mast to support the sail when the tension in the halyard or other hauling line is removed. It would also be possible to incorporate further latching devices at spaced locations along the mast to allow latching to take place at positions when the sail is not fully raised which could be useful during reefing operations. It will be appreciated that a device according to the invention can be incorporated in a variety of load bearing systems (which may or may not have yachting applications) to provide a releasable latching facility whereby tension in at least a part of a hauling line can be relaxed, e.g. tackle systems in which a movable block thereof can be releasably coupled to another block of the system, e.g. a fixed block, when required so that tension in the hauling rope can be relaxed. Indeed a device according to the invention is applicable generally to a wide variety of systems requiring a lock/release type of coupling.

Said latching means may include an abutment on one of said parts, at least one pawl mounted on the other of said parts for rotation between positions in which it does and does not cooperate with said abutment on relative movement of the parts and control means for positioning the pawl in a series of angular positions thereof during a latching or release sequence of said latching means. Said pawl preferably has a pair of opposed edges which are formed with recesses or notches to receive a corner portion of said abutment in the latched condition of said latching means.

In some embodiments said control means may comprise a resiliently biassed member engaged with the periphery of the pawl to temporarily locate the pawl in said angular positions during said latching and release sequences.

In embodiments of the invention where a generally tubular housing is provided, the housing may have at least one aperture in the wall thereof with at least one pawl mounted on the housing so as to be movable to an engaged position in which it projects through said aperture or a respective aperture into the interior of the housing, an abutment being provided on the shuttle device for engagement by said pawl in its latched position. Said abutment may be defined by a radial surface of an annular recess provided in the outer periphery of the shuttle device. In some arrangements of such embodiments of the invention, a pair of rotary pawls may be provided on the housing for movement through a pair of slots provided through the wall of the tubular housing at diametrically opposed locations. Further pawls may be disposed around the housing, if required.

In such embodiments, said control means may comprise at least one control member slidably mounted on the outer periphery of the housing for movement longitudinally thereof between a position in which it is clear of the rotational path of the, or a respective, pawl and an operating position in which it cooperates with the, or a respective, pawl to cause the pawl to rotate from a free position in which it does not cooperate with said abutment on the shuttle device to an engaged position in which it does so cooperate therewith, and vice versa, in response to movement of the shuttle device beyond the latched position thereof.

Said control member may be in the form of an angle-member, preferably an L-shaped member, having one limb slidingly engaging in a part of said aperture to project within the housing for engagement by a portion of the shuttle device for movement therewith as aforesaid and a further limb extending towards the respective pawl for cooperation therewith as aforesaid. Said portion of the shuttle device may be an annular shoulder provided by the radial surface of said recess opposite to the surface thereof providing said abutment for engaging said one limb of the or each control member when the pawl(s) are generally aligned with said recess so that the control member moves with the shuttle member on further movement thereof into the tubular housing thereby to cause said further limb to cooperate with the corresponding pawl to rotate it from its free position to its engaged position, or vice versa, depending on the initial position of the pawl.

In other constructions according to the invention, said control means may comprise means to position each pawl in a series of predetermined angular positions thereof during a latching or locking sequence and a release sequence preparatory to the subsequent engagement with the pawl by the shuttle device during such sequences. Said positioning means may comprise a positioning member fixed with respect to the associated pawl and having around its periphery a series of generally planar surfaces, and a control member on the housing which is arranged and biassed to engage each of said planar surfaces in turn as the pawl is rotated so as to locate the pawl in said predetermined angular positions as aforesaid.

In further arrangements according to the invention, said pawl may be mounted in the shuttle device together with said control means therefor, for cooperation with an abutment on a part or structure with respect to which the shuttle device is, in operation, relatively slidable.

In some of such further arrangements, resiliently biassed retaining means may be provided on the shuttle device to exert a force thereon when it is latched by said latching means to assist in maintaining the shuttle device in the latched condition.

According to a feature of the invention the leading end, or, in some embodiments where the shuttle device can pass through the housing in both directions, both ends of the shuttle device may have a converging nose portion. The end of the housing, into which said shuttle device engages in use, or both ends thereof, may be flared in order to facilitate such engagement.

BRIEF DESCRIPTION OF THE DRAWINGS

Embodiments of the invention will now be described by way of example and with reference to the accompanying drawings, in which:

FIG. 2 is a perspective view of the shuttle;

FIG. 3 is a perspective view of the outer tubular body part;

FIGS. 4A to 4F illustrate diagrammatically locking and release sequences of the device of FIG. 1;

FIGS. 8A to 8F illustrate diagrammatically locking and release sequences of the embodiments of FIGS. 5 to 7;

FIGS. 13A to 13B illustrate diagrammatically locking and release sequences of a sixth embodiment;

FIG. 14 illustrates in cross-section a modified housing for the shuttle of the embodiment of FIG. 13;

FIG. 15 illustrates diagrammatically a seventh embodiment, a part of which is shown in section;

DETAILED DESCRIPTION OF THE EMBODIMENTS

Figure 1:
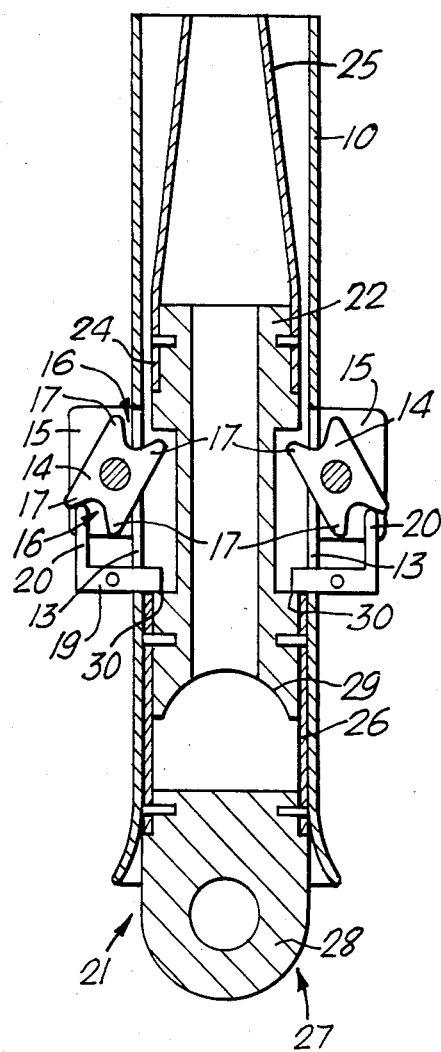
FIG. 1 is a vertical cross-section through a releasable locking device according to the invention which comprises an outer fixed tubular body part and an inner shuttle device engageable within the tubular body part.

Referring to FIGS. 1 to 4 of the drawings, there is shown a locking device for incorporation in a load-carrying line, e.g. a yacht's halyard. The device comprises an outer tubular housing 10 having adjacent its upper end a pair of tubular projections 11 for enabling the housing 10 to be firmly attached to a fixed structure, for example at the upper end of a yacht's mast. The lower end of the housing 10 is flared as indicated by the reference numeral 12. A pair of diametrically opposed slots 13 are formed at an intermediate location through the wall of the housing 10. A pair of locking pawls 14 are rotatably mounted for movement through the slots 13 respectively, on a respective pair of spaced flanges 15 which project radially outwardly of the wall of the housing 10, one on each side of the associated slot 13 in the wall of the body part. Each pawl 14 has a notch 16 in a pair of opposite faces thereof parallel to the axis of rotation of the respective cam thereby providing a pair of spaced engagement lugs 17 along opposed edges of the cam members.

A locking ring 18 is slidably mounted around the housing 10 in the lower region of the slots 13. The ring is formed by a pair of curved strips extending around respective portions of the wall of the housing 10 which lie between corresponding edges of the slot 13. The strips have at their ends radial flanges between which generally L-shaped catch members are secured. A lower horizontal portion of each catch member 19 engages for sliding movement through the respective slot 13, with the generally vertical finger 20 of each member 19 being movable to engage the lower lugs 17 of the pawls by sliding movement of the locking ring 18, as described below.

The device further comprises an inner shuttle member 21 which includes a generally cylindrical tubular body part 22 having an annular groove 23 provided at a generally central location in the outer periphery thereof. The upper annular radial surface 24 of the groove provides an abutment surface for engagement by the pawls 17 and the lower annular radial surface of the groove projects radially beyond the upper surface 24 to form a shoulder 30 for engaging the horizontal limbs of the catch member 19, as described below with reference to FIG. 4.

The shuttle member 21 is provided at its upper end with a tubular sheet metal part 25 which progressively converges towards its upper end thereby providing a nose portion facilitating engagement of the shuttle within the tubular housing 10. This is also assisted by the provision of the flared lower end 12 of the housing. A sheet metal tubular extension 26 is provided at the lower end of the body part 22 of the shuttle to project downwardly therefrom and a load fixing device 27 is secured at the free end of the part 26. In the present embodiment the load fixing device is an eyelet 28 but could in other embodiments be in the form of a hook or a swivel joint or other suitable means. The shuttle is secured to the free end of a halyard by passing the rope through the interior of the tubular nose portion 25 of the shuttle and through the interior of the body part 22. The portion of the rope projecting from the lower end of the passage in the body part 22 is knotted in order to prevent withdrawal of the rope from the shuttle. For this purpose a part spherical depression 29 is formed in the lower end of the body part 22 to provide a seating surface for the knot. A rope associated with the upper end of the sail is passed through the eyelet of the load fixing part 27.

Referring particularly to FIGS. 4A to 4C, on raising the sail by applying tension to the halyard the shuttle 21 eventually engages with its nose portion 25 in the flared lower end of the tubular housing 10. On further raising of the sail the shuttle moves upwardly within the housing 10 so that its groove 23 in the shuttle is generally aligned with the pawls 14 (FIG. 4A). The shoulder 30 on the shuttle engages the locking ring 19 which is raised on further upward movement of the shuttle so that the fingers 20 of the members 19 engage a pair of lower, outer lugs 17 of the pawls, respectively, to rotate the pawls to engage them in the groove 23 as shown in FIG. 4B. When the tension in the halyard is relaxed the shuttle member 22 is latched with respect to the tubular housing 10 by engagement of a pair of lugs 17 at the upper portions of the pawls 14 with the annular radial abutment surface 24 of the groove 23. Edge portions of the shuttle 21 at the upper end of the groove 23 are therefore received in a pair of notches 16 in the pawls in the latched position. The locking ring disengages returning to its lower position as shown in FIG. 4C. In this way the sail is supported in its raised position and the mast is subjected to a compression force due to the weight of the sail only since the tension on the halyard has been relaxed.

FIGS. 4D to 4F illustrate a sequence for releasing the latch between the pawls 14 and the shuttle. Tension is applied to the halyard to lift the shuttle 21 to disengage it from the pawls 14. The locking ring is lifted by the shuttle 21 to engage the fingers 20 thereof with the pawls 14 thereby rotating the pawls 14 to their release positions as illustrated in FIG. 4D. Subsequent downward movement of the shuttle 21 within the tubular housing 10 is then not obstructed by the pawls 14 which are rotated by the shuttle to a position permitting the shuttle to disengage from the housing 10 to allow lowering of the sail, as illustrated in FIG. 4F. On downward movement of the shuttle the locking ring 19 moves downwards to disengage from the pawls 14 as illustrated in FIGS. 4E and 4F.

Figure 5A:
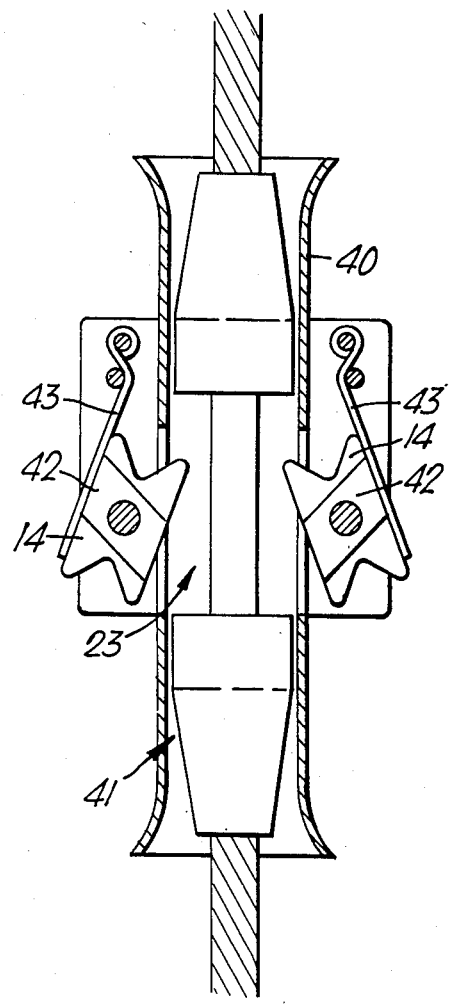
FIGS. 5A and 5B are a vertical cross-section of a second embodiment and a detail of a pawl thereof, respectively.
Figure 5B:
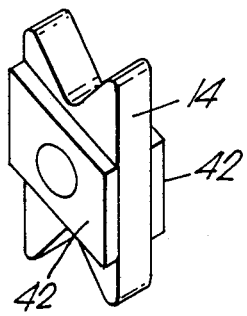

A further embodiment of a locking device according to the invention is shown in FIGS. 5A and 5B. The fixed tubular housing 40 is similar to the housing 10 of the FIG. 1 embodiment except that it is flared at both ends. The shuttle member 41 also has tapered nose sections at each end. The shuttle member is tubular throughout its length so that it can be positioned at an intermediate location on a hauling line.

The control mechanism of the pawls differs from that employed in the first embodiment. The pawls are provided on each side thereof with a positioning cam 42 in the form of a parallelogram. Resilient control members 43 are provided on the housing to control the pawls 14. The control members are in the form of leaf springs secured at one end and cooperating with the planar peripheral surfaces of the positioning cams 42 in order to locate the pawls 14 in predetermined angular positions in accordance with the particular edge surface of the positioning cam 42 with which the leaf spring 43 cooperates.

FIGS. 8A to 8C illustrate a locking sequence and FIGS. 8D to 8F illustrate a release sequence in the operation of the embodiment of FIG. 5. Before entry of the shuttle device into the lower end of the housing 40, the pawls 14 are positioned as shown in FIG. 5A. When the shuttle engages in the lower end of the housing 40 its upper tapered nose portion engages the pawls to move them against the biassing force of the springs 43 to the position shown in FIG. 8A. When the pawls 14 are opposite the groove 23 in the shuttle member, the springs 43 rotate the pawls 14 to the position shown in FIG. 8B so that on the subsequent downward movement of the shuttle 41 the pawls 14 are in position to obstruct withdrawal of the shuttle from the housing 40 as shown in FIG. 8C.

In order to release the shuttle 41, it is first raised from its locked position (FIG. 8C). The springs 43 are then free to act on the positioning cams 42 such that they are rotated to the position shown in FIG. 8D whereby both the lugs 17 on the edge of the pawl 14 adjacent the shuttle 41, are engaged in the peripheral recess 23 in the shuttle member. The following downward movement of the shuttle 41 then causes the pawls 14 to rotate against the biassing force of their springs 43, as shown in FIG. 8E until the pawls are brought to their position clear of the shuttle 41, as shown in FIG. 8F. When the shuttle 41 has been withdrawn from the housing the pawls are rotated back to the position shown in FIG. 5A under the action of the springs 43 in readiness for a further locking sequence.

It will be appreciated that with the design of FIG. 5, the shuttle 41 has an unobstructed passage right through the tubular housing 40. On subsequent downward movement through the housing 40, the pawls 14 will be moved outwardly by engagement of the lower tapered nose portion of the shuttle member allowing the shuttle to pass these pawls until the pawls are engaged in the groove 23 as shown in FIG. 5A. Then in order to withdraw the shuttle from the lower end of the housing 40 it is necessary to follow the release sequence shown in FIGS. 8D to 8F. It will be appreciated that several shuttle members 41 can be provided at spaced locations along a load bearing line or a series of tubular housings 41 can be provided at spaced locations along the line to allow a series of different locking positions as required.

Figure 6:
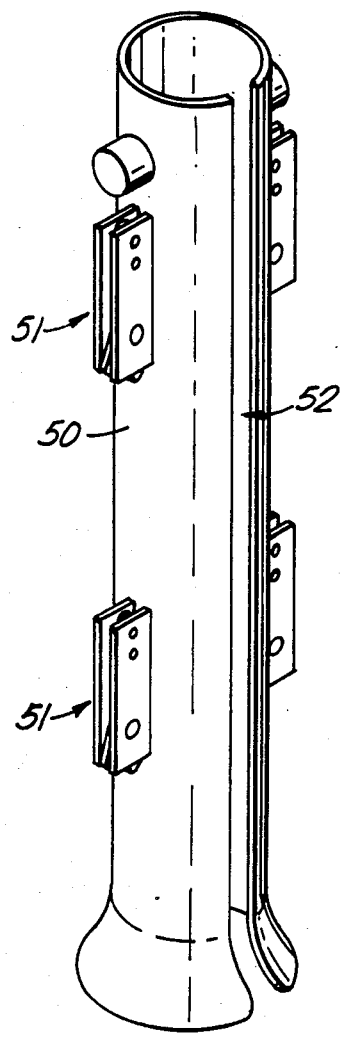
FIG. 6 is a perspective view of a housing of a third embodiment.
Figure 7:
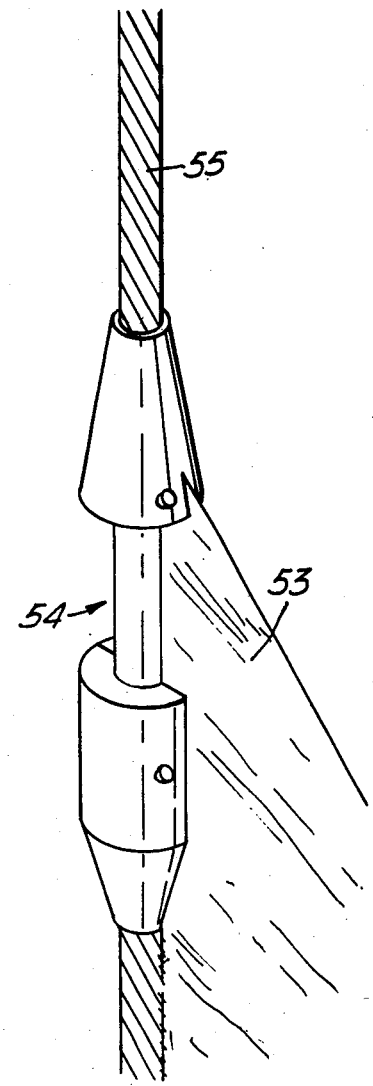
FIG. 7 is a perspective view of a shuttle device associated with a sail for use with the housing of FIG. 6.

FIGS. 6 and 7 show another embodiment specifically adapted for sail handling in order to facilitate reefing operations. This device has an extended tubular housing 50 having a longitudinal slot 52 extending the length thereof. Two sets of pawl mechanisms 51 are located at spaced locations along the housing which has a flared lower end. The pawl mechanisms 51 are similar to the constructions thereof used in the embodiment of FIG. 5. The shuttle 54 shown in FIG. 7 is fabricated in two portions which are secured to the edge of a sail 53. A longitudinal slot 52 in the tubular housing receives the edge of the sail 53 when the shuttle 54 engages in the lower end of the housing. When the sail is raised the shuttle engages in the housing 50 and passes freely through the lower pawl mechanism 51 until it reaches the upper pawl mechanism where it becomes latched when the tension in the halyard 55 is relaxed. In order to release this latching at the upper position the release sequence illustrated in FIGS. 8D to 8F is followed. On subsequent lowering of the sail the shuttle 54 becomes latched at the lower mechanism 51 which requires a further release sequence in accordance with FIGS. 8D to 8F to be carried out at this lower position before the sail can be fully lowered. The provision of latching facilities at different locations along the housing 50 enables reefing to be achieved.

Figure 9:
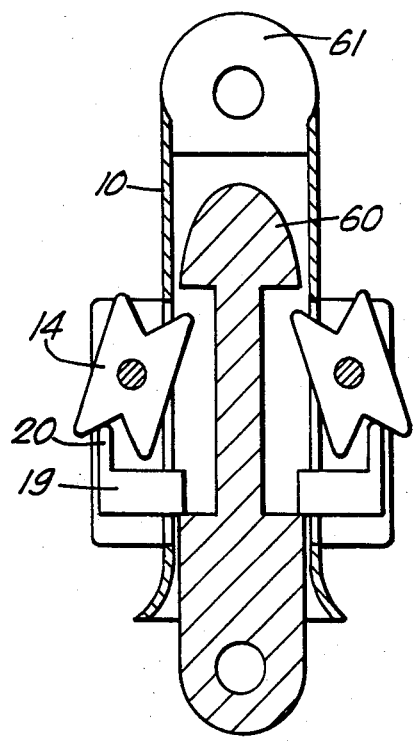
FIG. 9 is a vertical cross-section through a fourth embodiment.
Figure 10:
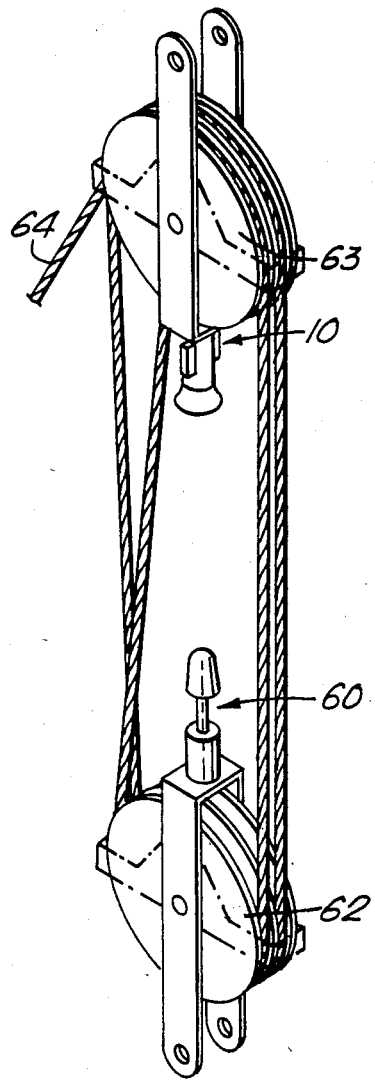
FIG. 10 is a perspective view of a tackle system utilizing the coupling device of FIG. 9.

FIG. 9 shows an adaptation of the device shown in FIG. 1 which is in the form of an automatic coupling device. In this embodiment the shuttle 60 is formed as a solid member with a suitable connection portion formed at its lower end for coupling to another part. similarly a coupling element 61 for connection to a further part is provided at the upper end of the tubular housing 10. FIG. 10 illustrates a typical use of such a coupling device in a tackle system. The shuttle 60 is attached to a movable block 62 of the system and the tubular housing 10 is secured with respect to a fixed block 63, in alignment with the shuttle 60. When the block 60 is fully raised the shuttle engages in the tubular housing 10 to become automatically latched thereto so that tension in the hauling rope section 64 can be relaxed without the load associated with the movable block 62 being dropped. The coupling is released by applying tension to the hauling line section 64 in order to move the shuttle upwardly in the housing 10 so that the release sequence illustrated in FIG. 4D to 4F can be performed allowing the shuttle to disengage from the tubular housing.

Figure 11:
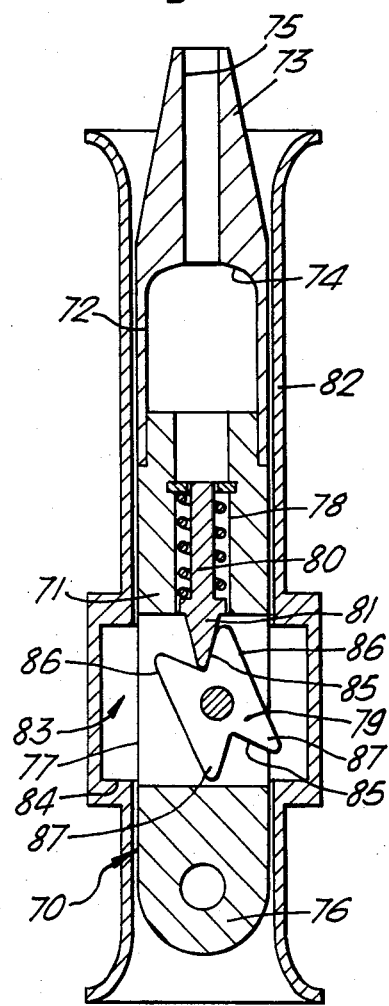
FIG. 11 is a vertical section through a fifth embodiment.
Figure 12:
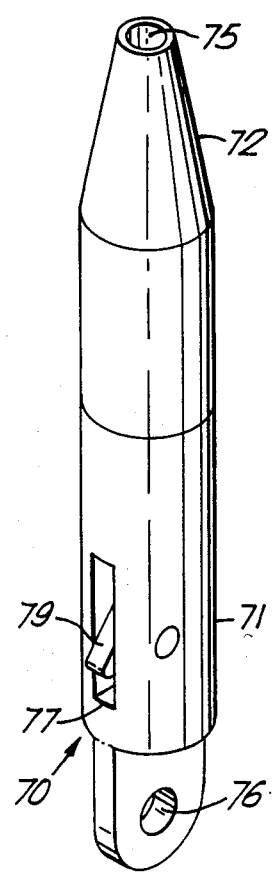
FIG. 12 is a perspective view of the shuttle of the embodiment of FIG. 11.

FIGS. 11 and 12 illustrate an embodiment in which the latching mechanism between the shuttle and the tubular housing is provided by a single rotatable pawl which is carried by the shuttle and cooperates with an abutment surface on the housing during a latching operation.

The shuttle 70 comprises a lower cylindrical body part 71 and an upper nose portion 72 having a frusto-conical leading end 73. The nose portion 72 has an inner seating surface 74 for a knotted end of a rope which extends within the nose portion through an axial passage 75 therein. The lower end of the body portion 71 is formed with an eyelet 76 for securing a further rope thereto.

The body part 71 is formed with a traverse slot 77 and an axial bore 78 extending from the upper end of the body part to intersect the slot 77. A rotary pawl 79, similar to those used in the previous embodiments, is located in the slot 77. A spring-loaded peg 80 is located in the bore 78 and is biassed so that its tapered head portion 81 is held in engagement with the periphery of the pawl 79.

The tubular housing 82 of the device is flared at each end and the wall of the housing towards its lower end is formed to provide a circumferential recess 83 in the internal surface of the housing. The lower annular surface 84 of this recess provides a load carrying shoulder with which the pawl 79 cooperates in the "locked" condition of the shuttle 70 within the housing 82.

When the shuttle is engaged in the lower end of the housing on upward movement of the shuttle, or in the upper end of the housing on downward movement of the shuttle, the pawl, which initially projects outwardly of the shuttle under the action of the spring-biassed peg 80 engaging in the V-shaped notch 85 uppermost at that time, is moved within the body of the shuttle against the action of the biassed peg 80 by engagement with the internal wall of the housing. On further movement of the shuttle into the housing 82 the pawl is disposed opposite the recess 83 and the spring-biassed peg 80 acts on the pawl to move it again to project outwardly of the shuttle body as illustrated in FIG. 11. On subsequent downward movement of the shuttle the load carrying shoulder 84 becomes engaged in the lowermost notch 85 in the pawl 79 to prevent further downward movement of the shuttle. The pawl is thereby rotated to a position in which the peg 80 acts on one of its straight side surfaces 86.

In order to allow the shuttle to pass downwardly out of the housing 82, a "release" sequence is followed similar to that for the previously described embodiments. The shuttle is first lifted to allow the spring-loaded peg 80, which is then acting on a side surface 86 of the pawl, to rotate the pawl to a position in which the lowermost pair of lugs 87 defined by the lowermost notch 85 are both received in the recess 83. Then on subsequent downward movement of the shuttle, the pawl is in a disposition in which it can be rotated to a position completely within the shuttle body, against the action of the spring loaded peg 80, by engagement with the annular abutment surface 84 on the housing to permit withdrawal of the shuttle from the lower end of the housing.

Instead of a spring loaded peg 80, other control devices for the pawl 79 may be provided, e.g. a spring loaded ball, as described below in relation to FIG. 13, or a spring loaded cup assembly in which the spring is partly housed in the cup.

In a fall arrest mechanism, for example, for a rope lift at a building site, the tubular housing 82 of the previous embodiment may be replaced by a relatively short sleeve member through which the shuttle can pass. This is shown diagrammatically in FIG. 13 illustrating a sleeve 90 and a tubular shuttle 91 incorporated in a rope lift device. FIG. 13A illustrates the shuttle 91 falling downwardly towards the sleeve 90; FIG. 13B illustrates the shuttle arrested by the sleeve and FIG. 13C illustrates lifting of the shuttle from its "arrested" position in FIG. 13B in order to allow downward movement of the shuttle through the sleeve 90 to take place.

In FIG. 13A the pawl 92 is held, by the spring loaded ball 93 engaging in the notch 94 in the upper end of the pawl, in a position in which it projects outwardly of the shuttle. In the "arrest" condition illustrated in FIG. 13B, the shoulder provided by the upper edge of the sleeve 90 is located in the notch 94 at the lower end of the pawl. This causes the pawl to rotate in a clockwise direction against the action of the spring loaded ball 93 which, in the "arrest" position, acts on a straight side surface 96 of the pawl. In order to release the shuttle it is raised as illustrated in FIG. 13C whereby the spring-loaded ball 93 acting on the side surface 96 of the pawl, causes the pawl to rotate to a generally horizontal position with the ball being received in a depression 97 formed in the surface 96 of the pawl. Then on downward movement of the shuttle 91 the straight side surface 98 of the pawl, which is lowermost in FIG. 13C, engages the upper periphery of the sleeve 90 and, on further downward movement of the shuttle, is rotated to a position in which it does not project from the shuttle. When the shuttle 91 is below and clear of the sleeve 90, the spring-loaded ball 93 acts on the pawl to rotate it to the position shown in FIG. 13A. The axle of the pawl may fit in corresponding circular holes in the shuttle wall or such holes may be elongate to allow a small degree of displacement under the action of the spring in the engagement contacts of the pawl. Further arrest sleeves may be provided at lower positions so that the shuttle will be automatically arrested there and a further release sequence as described above will be required to pass such sleeves.

For a lift at a building site a series of rings 90 may be located at different levels with the rope lift incorporating the shuttle 91 passing through all the rings to provide a "lock-up" provision at various levels of a building structure. The rings may in some cases be offset from one another and may be coupled together to maintain the required relative disposition thereof.

Each ring in the above described systems may be replaced by a tube 100 as illustrated in FIG. 14. The tube is formed with an internal recess 101 defining a lower abutment surface 102 for cooperation with the pawl of the shuttle in the "arrest" or "latched" condition thereof. The lower entry portion 103 of the bore of the tube 100 is flared to facilitate entry of the nose portion of the shuttle therein.

FIG. 15 illustrates another embodiment similar to that of FIG. 13. In this system a slot 110, or a series of angularly spaced slots, are formed in the upper end of the sleeve 111 to receive the pawl 112 in the latched condition (which is equivalent to the "arrest" condition illustrated in FIG. 13B). This then provides a rotary coupling between the shuttle 113 and the sleeve 111 when the shuttle is engaged therein to allow a rotary drive to be transmitted therebetween. This coupling may be maintained in engagement simply by gravity, or alternatively specific means may be provided to retain the coupling engaged. One example of such retaining means is an outer sleeve 114 around a lower portion of the shuttle, the outer sleeve being biassed by a compression spring 115 firmly against the lower end surface of the sleeve 111. In order to release the coupling, the sleeve must be lifted, against the action of spring 115, to allow the pawl to be moved to the "release" position as illustrated in FIG. 13C. A possible application of such a system is for a power take off drive where the driver member is thus coupled and uncoupled from the driven member.

Figure 16:
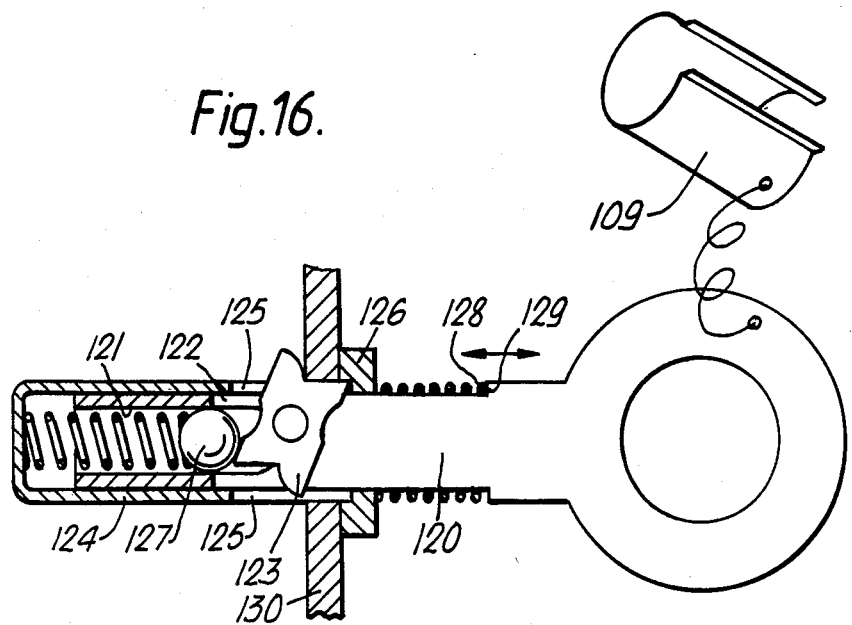
FIG. 16 illustrates a diagrammatic cross-section through an eighth embodiment.

FIG. 16 illustrates an embodiment of the invention in the form of a releasable "plug-in" coupling for a fitting, in this case an eyebolt, in an aperture in a support surface. The eyebolt shank 120 has a hollow end portion 121 with a transverse slot 122 communicating therewith in which the rotary pawl 123 is mounted. An end portion of the shank 120 is slidably received in a cup-shaped sleeve 124 which has transverse slots 125 in its wall through which parts of the pawl can project and a collar 126 fixed to the open end of the sleeve and slidably receiving the shank 120. The spring-loaded ball 127, which controls the pawl 123, is housed in the hollow end portion 121 of the shank 120 with the spring abutting the end wall of the cup-shaped sleeve 124. The device also includes a second compression spring 128 encircling the shank 120 to act between an annular shoulder 129 formed thereon and the collar 126.

The eyebolt can be secured in an aperture in a surface 130 by passing the sleeve 124 through the aperture until the collar 126 abuts the surface 130. Further movement of eyebolt shank 120 within the outer sleeve 124 against the action of the compression spring 128, brings the pawl 123 beyond the rear edge of the aperture in the surface 130, whereupon the spring-loaded ball 127 rotates the pawl so that it projects outwardly of the sleeve 124 through the slots 122 in the eyebolt shank and the slots 125 in the outer sleeve. When the pressure on the eyebolt is released, the compression spring 128 moves the eyebolt axially with respect to the outer sleeve 124 whereby the pawl 123 latches with a portion of the surface 130 surrounding the aperture therein, as shown in FIG. 16. This "latched" condition is maintained by the action of the compression spring 128. In order to prevent accidental release action the latched condition can be locked by such as a shaped keep plate 109 springing into place around the shank 120, or a lock pin.

In order to release the eyebolt, its shank is again moved axially into the sleeve 124 against the action of compression spring 128, whereupon the pawl 123 is rotated by the spring-loaded ball to a position equivalent to that shown in FIG. 13C, whereby the shank can then be freely withdrawn from the aperture in the surface 130.

In other similar embodiments such a "plug-in" coupling may be used to locate a safety line attached to a harness worn by a person working high up on a building structure. Indeed there are numerous other possible applications of this type of "plug-in" coupling.

Figure 17:
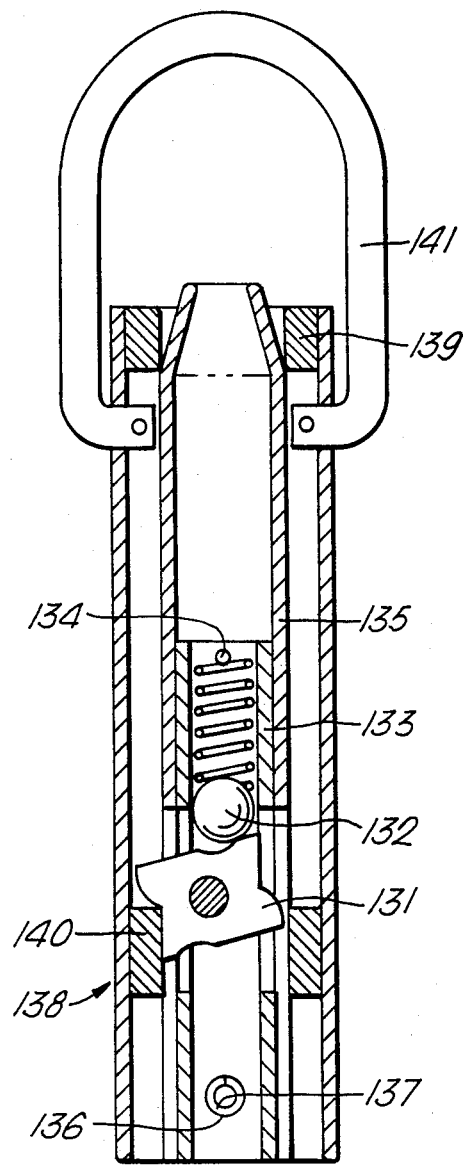
FIG. 17 illustrates a diagrammatic vertical section through a ninth embodiment.

FIG. 17 shows a further embodiment utilizing the latching mechanism illustrated in FIG. 13. In this embodiment the rotary pawl 131 and the spring-loaded ball 132 controlling the positioning of the pawl are mounted in a pre-assembled inner shuttle in the form of a sleeve 133 having a transverse retaining pin 134 providing an abutment for the compression spring associated with the ball 132. The inner shuttle is, in use, received in the lower end portion of an outer shuttle which is in the form of a sleeve 135 having a tapered upper end to facilitate entry into a cooperating housing and to provide a rope grip. The inner and outer shuttles 133 and 135 each have a pair of diametrically opposed holes 136 which are aligned when the inner shuttle is engaged in the outer shuttle so that the shuttles can be united by a load carrying pin 137 or a bolt.

The two part shuttle can be used, for example, in conjunction with a housing 138 as shown in FIG. 17. The housing comprises a hollow cylindrical member provided with a first internal annular collar 139 at its upper end which acts as a rope guide and a second internal annular collar 140 towards its lower end with which the pawl 131 cooperates in the latched condition as illustrated in FIG. 17. A hanger 141 is provided at the upper end of the housing 138 to enable the housing to be suspended in use.

The purpose of a two-part shuttle is to enable the inner shuttle, which carries the entire latching mechanism, to be mounted in several different outer shuttles as required.

Figure 18:
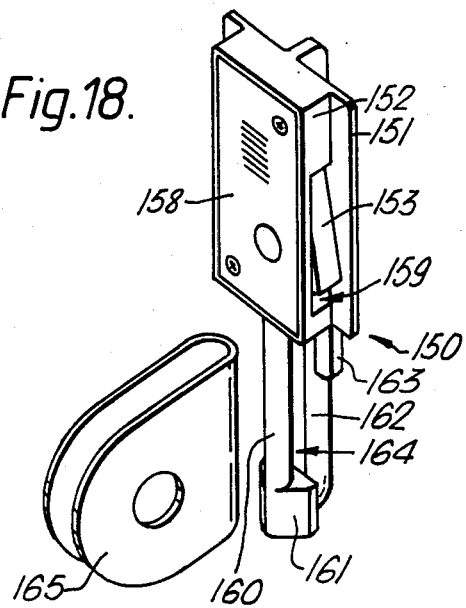
FIG. 18 illustrates a perspective view of a shuttle of a tenth embodiment.
Figure 19:
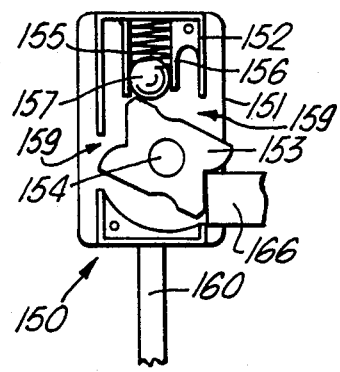
FIG. 19 illustrates a detail of the shuttle of FIG. 18.
Figure 20:
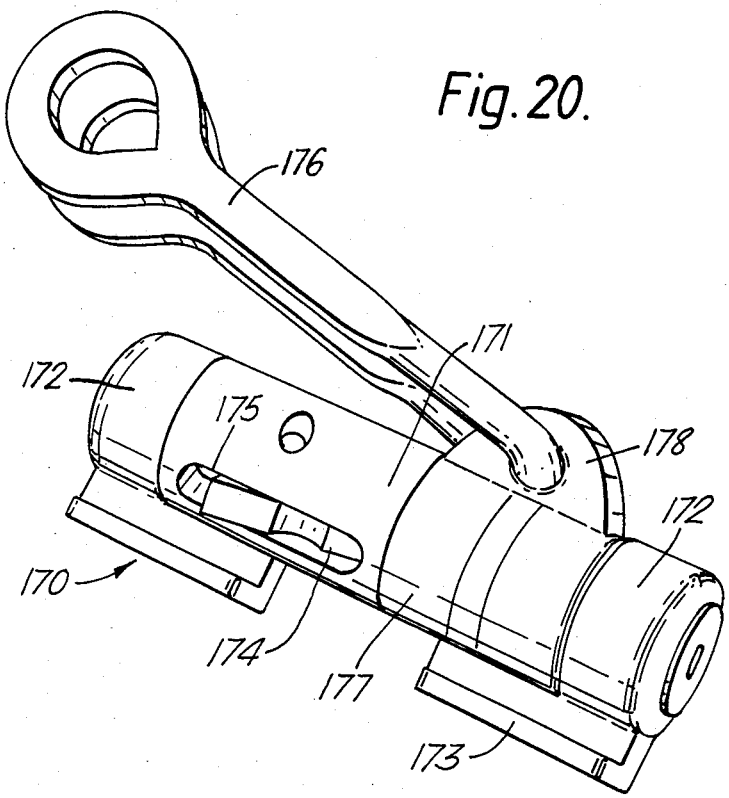
FIG. 20 illustrates a perspective view of an eleventh embodiment.

FIGS. 18 to 20 illustrate a further embodiment of the invention which is adapted for use on a yacht to enable a sail to be latched with respect to the mast head in its raised or partly raised positions. In this embodiment the shuttle 150 is in the form of a traveller adapted to slidably engage in the luff slot of a mast for the normal sliders between the luff of a sail and the mast, and to carry the headboard of a sail. The shuttle 150 comprises a base plate 151 having a generally rectangular wall 152 upstanding from one side thereof to house the latch mechanism which is similar to that provided in the shuttle 91 as shown in FIG. 13. A rotary pawl 153 is located on a pin 154 which is formed as part of the base plate casting. A pair of generally parallel internal walls 155 and 156 define a channel which houses the spring-loaded ball 157 for controlling the angular positioning of the pawl during latching and release operations.

The latch mechanism housing is closed by a cover plate 158 secured by a pair of screws to the base plate. A pair of slots 159 are provided in the vertical sections of the peripheral wall 152 of the latch mechanism housing, through which slots the pawl projects during operation of the mechanism.

The base plate 151 is formed with a depending leg 160 having a lateral projecting foot 161 at its lower end. The base plate is also formed with an integral vertical flange 162, which projects rearwardly thereof and extends from the top of the base plate to the bottom of the leg 160, for engaging in the luff-slot of a mast. The flange 162 is formed with a pair of lateral abutments 163, one on each side thereof, to retain the flange in engagement in the luff-slot. A slot 164 is provided in the flange 162 adjacent to and along the leg 160 to receive the base portion of a U-shaped clip 165 which then embraces the leg 160 and is supported on the foot 161. The U-shaped clip is bolted to a headboard clamped to the top of a sail which is to be lifted into the crane of the respective mast. An abutment 166 in the form of a small plate is rivetted to the mast adjacent the luff-slot to cooperate with the pawl 153 in the latched condition as shown in FIG. 19. The latching and release operations are equivalent to those illustrated in FIGS. 13A–13C. The abutment 166 is provided at or adjacent the top of the mast. Other such abutments could be provided at different levels along the mast as required for reefing operations. In a further embodiment the shuttle can be operated within the mast section with attachments through the luff-slot.

In other similar embodiments, it would be possible to provide one or a pair of rotary pawls on the mast to cooperate with an abutment surface(s) provided on the shuttle, similar to the arrangements described with reference to FIGS. 1 to 10.

An advantage of this sail handling system is that the sail lifting halyard could be replaced by a smaller rope since tension therein is relieved when the sail is in its raised position. This allows a smaller sheave to be used at the top of the mast thereby reducing the weight at the mast head. The components of the system can be made of metal or plastics material.

FIG. 20 illustrates another form of a shuttle adapted to engage in the luff-slot of a mast. The shuttle 170 has a generally cylindrical, hollow body 171 with end caps 172 rotatably secured thereto and formed with T-shaped flanges 173 for engaging in and sliding along the luff-slot. Within the body 171 there is a rotary pawl 174 which can project through a slot 175 in the body 171 in the latched position thereof. The pawl 174 is controlled by a spring-loaded ball (as in the embodiment shown in FIG. 19) which is also housed within the hollow body 171. A U-shaped shackle 176 for connection to the luff of a sail, is pivotably attached to the body 171 by a collar 177 encircling the body 171 and having a projecting eyelet 178 through which the base portion of the shackle 176 extends.

Figure 21:
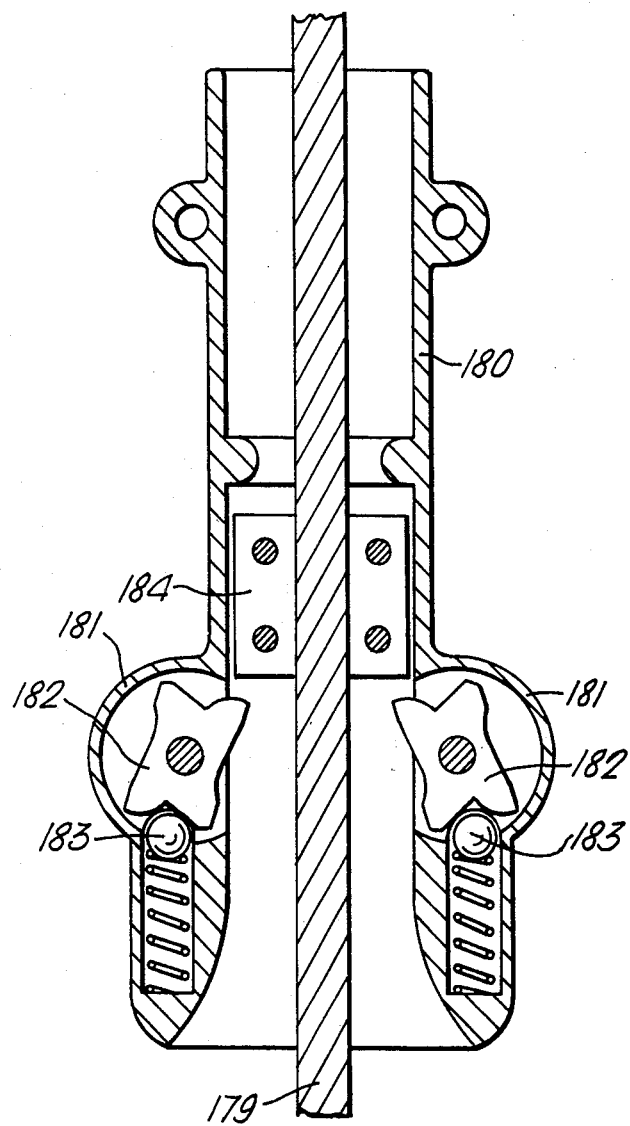
FIG. 21 illustrates a diagrammatic vertical section through a twelfth embodiment.

FIG. 21 illustrates a latching system similar to that of FIG. 5. The housing 180 is formed at its lower end with part-spherical cavities 181 for containing respective rotary pawls 182 which are controlled by spring-loaded balls 183. A cylindrical collar 184, formed in two parts secured together, is clamped onto a halyard or other hauling line 179 extending through the housing 180 for latching with the pawls 182 when in their "latched" positions.

Figure 22:
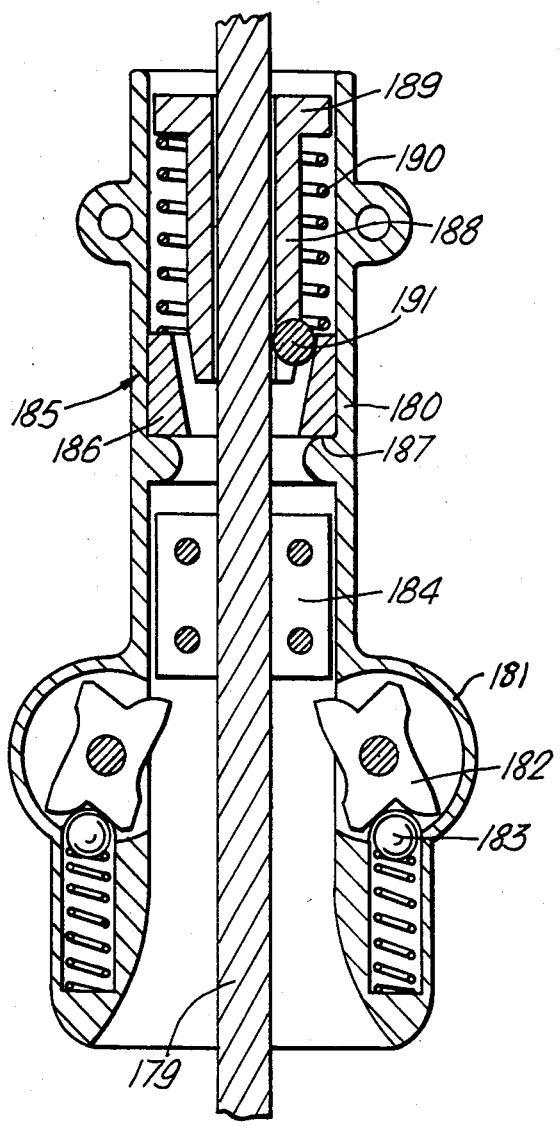
FIG. 22 illustrates a diagrammatic vertical section through a thirteenth embodiment.

FIG. 22 shows the system of FIG. 21 fitted with a fall arrest device 185. The device 185 comprises a lower collar 186 which has a converging, frustoconical inner periphery and rests on an annular rib 187 on the inner periphery of the housing 180. A sleeve 188 surrounds the line 179 with clearance and has a flange 189 at its upper end and an aperture in its wall at its lower end, in which a ball 191 is carried. A compression spring 190 acts between the flange 189 and the lower collar 186 to urge the sleeve 188 upwardly so that the ball is positioned at the upper, large-diameter end of the collar 186 out of contact with the line 179. The position of the sleeve 189 is controlled by a pulley positioned above the housing 180 and having an associated centrifugally operated lever mechanism which acts on the upper end of the sleeve 189 when a fall occurs and the velocity of the line exceeds at a preset value. In such circumstances the sleeve 189 is depressed further into the collar 186 whereby the ball 191 becomes firmly wedged between the inner periphery of the collar 186 and the line 179 to arrest the downward motion of the line 179.

Figure 23:
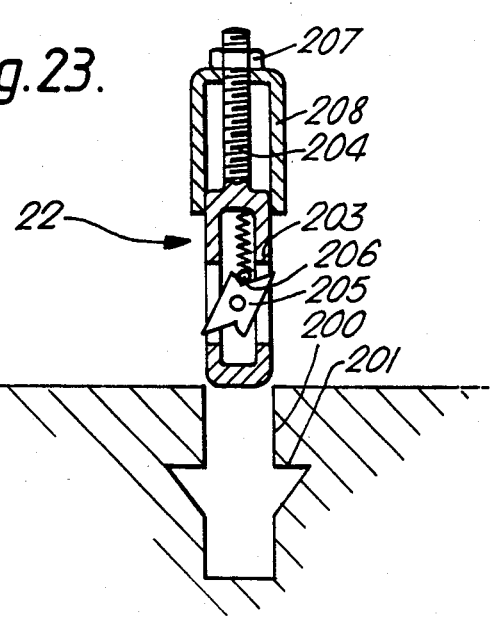
FIG. 23 illustrates a diagrammatic vertical section through a fourteenth embodiment.

FIG. 23 shows an embodiment of the invention in the form of a bolt for securing in a hole 200 in a concrete floor. The hole 200 is undercut at one position or a plurality of positions 201 (to allow different orientations of the bolt) by an undercutting tool. The bolt 202 comprises a hollow shank 203 having a threaded neck 204. The hollow shank 203 contains a rotary pawl 205 and a spring-loaded ball 206 controlling the orientation of the pawl, as in previously described embodiments. The bolt is inserted in the hole 200 until the pawl becomes locked in one of the undercut portions thereof. A tension force is applied to the bolt by tightening a nut 207 on the threaded neck 204 against an inverted cup-shaped collar 208 located on the neck 204 and which engages, at its lower end, the surface of the concrete floor surrounding the hole 200. Preferably a tin liner is provided in the hole 200 in the concrete to guide the pawl towards one of the undercut areas 201. Slots in the tin liner can be used to orient the bolt by engagement of the pawl. This construction provides a positive engagement concrete bolt which can be readily withdrawn after one use for a further use.

Figure 24:
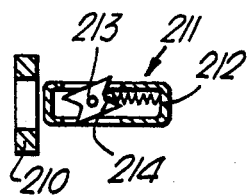
FIG. 24 illustrates a diagrammatic section through a fifteenth embodiment.

FIG. 24 shows an embodiment adapted for use as a door catch or for releasably locking together panels, e.g. as a joint between panels in a partitioning system. A ring member 210 is provided on one part, e.g. a door jam or one panel element, and a latching device 211 is provided on the other part, e.g. the door or a mating panel element. The latching device comprises basically a hollow housing 212 containing a rotary pawl 213 and a spring-loaded ball 214 which controls the orientation of the pawl. As a door catch, the operation is "push-to-close" and then "push-to-open" thereby obviating the need for any of the conventional door furniture.

Figure 25:
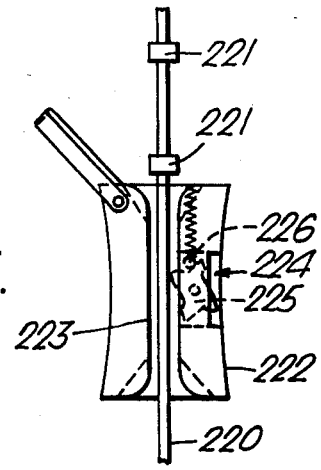
FIG. 25 illustrates a diagrammatic side view of a sixteenth embodiment.

FIG. 25 shows an embodiment for controlling a hauling line 220 whereby the line is releasably locked at different positions along its length as it is hauled in. Collars 221 are fitted on the line 220 at the different locking positions therealong. The line passes through a generally annular housing 222 which is attached to a fixed structure. The wall of the housing 222 has a longitudinal slit 223 along its length through which the line can be introduced into the longitudinal aperture through the housing, which aperture is flared at each end thereof. The wall of the housing has a transverse slot 224 in which a rotary pawl 225 is located and is controlled, as in previous embodiments, by a spring loaded ball 226. The line 220 is therefore latched when any collar 221 interengages with the pawl 225. The collar 221 is then released for further passage through the housing 222 by relaxing the tension in the line 220 and then reapplying such tension.

Figure 27:
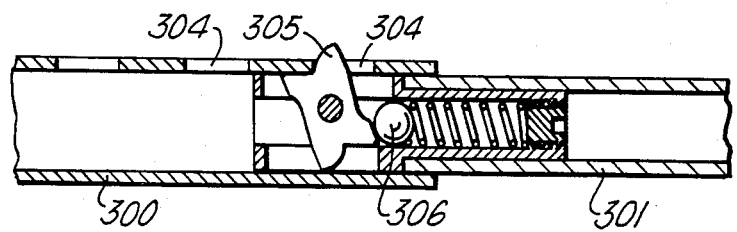
FIG. 27 illustrates a diagrammatic side view in cross-section of a central portion of the device of FIG. 26.
Figure 26:
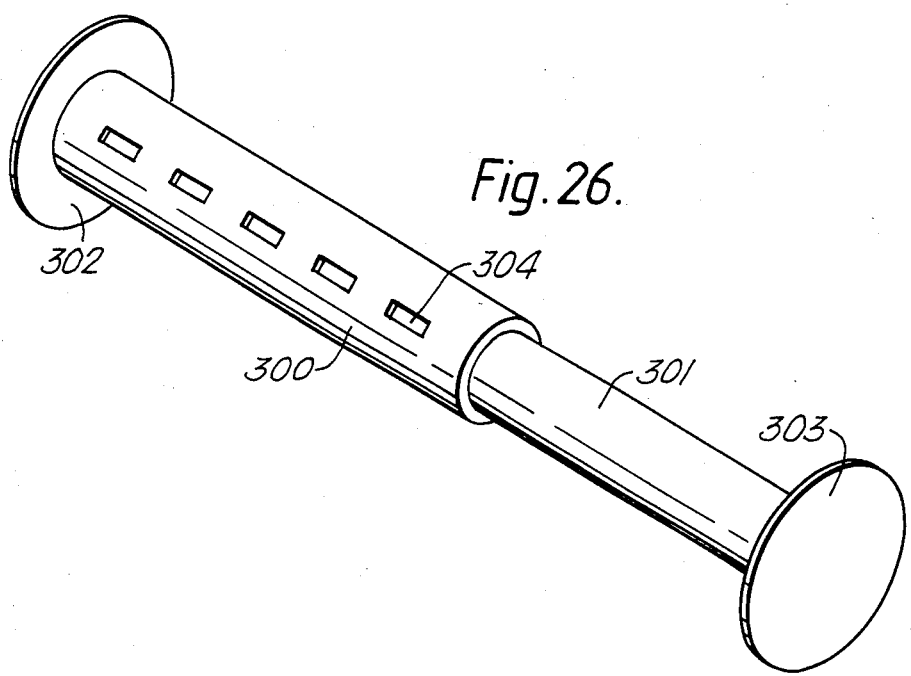
FIG. 26 illustrates a diagrammatic perspective view of a seventeenth embodiment.

FIGS. 26 and 27 illustrate a further embodiment in the form of a tensioning strut or jack comprising two tubular parts 300, 301, one slidably fitting within the other in the manner of a telescope. Each part has a circular thrust plate 302, 303 at one end thereof. The outer part 300 has a series of rectangular slots 304 through its wall. The inner part 301 fitted at one end of a rotary pawl 305, the rotational position of which is controlled by a spring loaded ball 306 in the manner described above in relation to the previous embodiments of the invention, e.g. the embodiment of FIG. 13. The strut or jack can be held in a fully extended position or a number of partly extended positions by the pawl 305 locking in a selected one of the slots 304 (as illustrated in FIG. 27). From a locked position, which is maintained when the strut or jack is under compression loading in use, the strut or jack can be collapsed to the next locking position by relative movement of the parts 300, 301 away from one another, to allow the ball 306 to act freely on the pawl 305 to permit movement of the parts 300, 301 to next locking position at the next adjacent slot 304, on subsequent relative movement of the parts 300, 301 towards one another, e.g. as illustrated in FIG. 13C. Such a device can therefore provide a means acting to tension hold apart or a means to act as a jack.

An advantage of locking or coupling systems according to the invention is that, if they fail under excessive loading the pawl(s), they tend to jam between the shuttle and the cooperating abutment thereby providing a fail safe situation.

We claim:

1. A releasable locking, coupling or support device, comprising first and second cooperating parts which are positionable into a slidable disposition relative to each other, and interengageable latching means on said first and second parts characterised in that said latching means are engageable automatically when said first and second parts are in said disposition and the second of said parts is moved in a first direction relative to the first part by a predetermined amount so as to restrict subsequent movement of said second part relative to said first part, and are disengageable automatically upon a predetermined movement of said second part relative to said first part, from the latched position thereof, followed by movement in said first direction in an opposite direction; at least one abutment being provided on the first one of said cooperating parts; at least one rotary pawl being mounted on the second of said parts for cooperation with the abutment and being freely rotatable through complete revolutions about its axis of rotation; said pawl having a peripheral portion of generally parallelogram shape; a pair of notches formed in a pair of opposite side edges of the pawl for receiving an edge portion of the abutment in a locking position of the device; and control means including resilient means positioned on said second part for engaging in succession each side of the parallelogram-shaped peripheral portion associated with the pawl, as the pawl is rotated by engagement and disengagement from the abutment so as to rotate and then locate the pawl in the required angular position thereof for the next step in a locking and release sequence.

2. A device as claimed in claim 1, characterised in that said second part is a shuttle device and said first part is a generally tubular housing (10) in at least one end of which said shuttle device is engageable by said latch means.

3. A device as claimed in claim 1, characterised in that said second part is a shuttle device for slidably mounting on an elongate track, said first part being an abutment for location on said track adjacent the path of movement of the shuttle device therealong.

4. A device as claimed in claim 1, characterised in that said at least one pawl is mounted for rotation between said positions in which said pawl cooperates and positions in which said pawl does not cooperate with said abutment on relative movement between said first and second parts;

5. A device as claimed in claim 4 characterised in that said control means comprises a member biassed by said resilient means and engaged with the periphery of the pawl to temporarily locate the pawl in said angular positions during said latching and release sequences.

6. A device as claimed in claim 4, characterised in that said pawl is mounted in a shuttle device together with said control means therefor, for cooperation with an abutment on a structure relative to which the shuttle device is slidable during operation.

7. A device as claimed in claim 6, characterised in that said pawl engages in a slot in said structure in the latched condition so as to form a rotary drive coupling therebetween.

8. A device as claimed in claim 6 characterised in that resiliently biassed retaining means are provided on the shuttle device to exert a force upon the structure with the abutment when the shuttle device is latched by said latching means to assist in maintaining the shuttle device in the latched condition.

9. A device as claimed in claim 8, characterised in that the shuttle device includes a coupling element having a shank part which contains said pawl and said control means and on which said resiliently biassed retaining means are carried, to provide a coupling which is inserted and releasably latched in an aperture in a support surface (130).

10. A device as claimed in claim 6, characterised in that the shuttle device is provided with at least one laterally projecting flange part for engagement in and movement along a slot in said structure; said abutment means being provided on said structure adjacent said slot for cooperation with said pawl in the latched condition.

11. A device as claimed in claim 6 characterised in that said shuttle device includes a threaded neck extending from a shank portion for engagement in an aperture, and means cooperating with the threaded neck to tension the body of the shuttle device when latched in said aperture.

12. A device as claimed in claim 6, characterised in that said structure comprises an annular element in which said shuttle device is engageable.

13. A device as claimed in claim 4, characterised in that said second part is formed by a collar fixed to a line and said first part is a housing through which said line passes.

14. A device as claimed in claim 1, characterised in that said first and second cooperating parts comprise two elongate parts which are telescopingly slidably one within the other and receive thrust loading at the distal ends thereof, said latching means being arranged on interengaging portions of said elongate parts facilitating a releasable locking of the parts to support loading applied at the opposite remote ends of the elongate parts.

15. A device as claimed in claim 1, characterised in that a pair of recesses are formed in a second pair of opposite side of said pawl for receiving said resilient means engaged therein and in said notches for positioning said pawl during disengagement of said pawl with said abutment.

* * * * *